US011674050B2

(12) United States Patent
Baldwin et al.

(10) Patent No.: US 11,674,050 B2
(45) Date of Patent: Jun. 13, 2023

(54) PHOSPHONATES AND USES THEREOF

(71) Applicant: MicroVention, Inc., Aliso Viejo, CA (US)

(72) Inventors: Aaron Baldwin, Orange, CA (US); John Belletto, Yorba Linda, CA (US); Garrett Ulrich, Huntington Beach, CA (US)

(73) Assignee: MicroVention, Inc., Aliso Viejo, CA (US)

( * ) Notice: Subject to any disclaimer, the term of this patent is extended or adjusted under 35 U.S.C. 154(b) by 360 days.

(21) Appl. No.: 16/754,362

(22) PCT Filed: Oct. 11, 2018

(86) PCT No.: PCT/US2018/055497
§ 371 (c)(1),
(2) Date: Apr. 7, 2020

(87) PCT Pub. No.: WO2019/075261
PCT Pub. Date: Apr. 18, 2019

(65) Prior Publication Data
US 2020/0239725 A1    Jul. 30, 2020

Related U.S. Application Data

(60) Provisional application No. 62/570,852, filed on Oct. 11, 2017.

(51) Int. Cl.
*C09D 143/02* (2006.01)
*C08K 5/5353* (2006.01)
(Continued)

(52) U.S. Cl.
CPC .......... *C09D 143/02* (2013.01); *C08K 5/5353* (2013.01); *C08K 5/5357* (2013.01); *C08K 9/04* (2013.01)

(58) Field of Classification Search
CPC ...... C09D 143/02; C08K 9/04; C08K 5/5357; C08K 5/5353
See application file for complete search history.

(56) References Cited

U.S. PATENT DOCUMENTS 6,127,127 A   10/2000   Eckhardt et al.
7,569,285 B2  8/2009    Schwartz et al.
(Continued)

FOREIGN PATENT DOCUMENTS

CN   104060249 A      9/2014
WO   2008/039959 A2   4/2008
WO   2019/075261 A1   4/2019

OTHER PUBLICATIONS

International Search Report and Written Opinion, dated Jan. 7, 2019, for International Application Serial No. PCT/US2018/055497 filed on Oct. 11, 2018.
(Continued)

*Primary Examiner* — John E Uselding
(74) *Attorney, Agent, or Firm* — K&L Gates LLP; Brian J. Novak; Benjamin D. Heuberger (57) ABSTRACT

Provided herein are coated substrates. Also provided herein are methods for attaching phosphonates, phosphonic acids, or derivatives thereof to an organic or an inorganic substrate (e.g., a metal oxide substrate) via phosphonate chemistry to form the coated substrates provided herein.

13 Claims, 5 Drawing Sheets

(51) Int. Cl.
*C08K 5/5357* (2006.01)
*C08K 9/04* (2006.01)

(56) References Cited

U.S. PATENT DOCUMENTS

| 2004/0001959 | A1 | 1/2004 | Schwartz et al. |
| 2004/0023048 | A1 | 2/2004 | Schwartz et al. |
| 2005/0255330 | A1* | 11/2005 | Meyer ............... C09D 167/025 |
| | | | 428/480 |
| 2008/0166470 | A1 | 7/2008 | Schwartz et al. |
| 2009/0123516 | A1 | 5/2009 | Agrawal et al. |
| 2011/0039995 | A1 | 2/2011 | Lomeijer et al. |
| 2012/0071967 | A1 | 3/2012 | Tarcha et al. |
| 2017/0232156 | A1 | 8/2017 | Ma et al. |

OTHER PUBLICATIONS

Extended European Search Report, dated Apr. 30, 2021, for European Patent Application Serial No. 18865489.1.
Hotchkiss, Peter J. The design, synthesis, and use of phosphonic acids for the surface modification of metal oxides (2008). Accessed from Internet at: URL:https://smartech.gatech.edu/handle/1853/31836 on Jan. 28, 2020.
Kyomoto et al., Superlubricious surface mimicking articular cartilage by grafting poly(2-methacryloyloxyethyl phosphorylcholine) on orthopaedic metal bearings. Journal of Biomedical Materials Research Part A, vol. 91A, No. 3, pp. 730-741 (2009).
Guerrero et al., Phosphonate coupling molecules for the control of surface/interface properties and the synthesis of Tanomaterials. Royal Society of Chemistry, Dalton Trans., 42:12569-12585 (2013).
Mutin et al., Hybrid materials from organophosphorus coupling molecules. Journal of Material Chemistry, 15:3761-3768 (2005).
Devillers et al., Induction Heating Vs Conventional Heating for the Hydrothermal Treatment of Nitinol and Its Subsequent 2-(Methacryloyloxy)ethyl 2-(trimethylammonio)ethyl Phosphate Coating by Surface-Initiated Atom Transfer Radical Polymerization. ACS Applied Materials and Interfaces, 3:4059-4066 (2011).
Hanson et al., Bonding Self-Assembled, Compact Organophosphonate Monolayers to the Native Oxide Surface of Silicon. Journal of the American Chemistry Society, 125:16074-16080 (2003).
Silverman et al., Comparative Properties of Siloxane vs. Phosphonate Monolayers on a Key Titanium Alloy. Langmuir, 21:225-228 (2005).
Adden et al., Phosphonic Acid Monolayers for Binding of Bioactive Molecules to Titanium Surfaces. Langmuir, 22:8197-8204 (2006).

* cited by examiner

PHOSPHONATES AND USES THEREOF

CROSS REFERENCE TO RELATED APPLICATIONS

This application is a U.S. national phase of PCT/US2018/055497, filed Oct. 11, 2018, which claims the benefit of U.S. Provisional Patent Application No. 62/570,852, filed Oct. 11, 2017, the entire disclosure each of which is incorporated herein by reference.

FIELD

Described are coated substrates and methods for attaching phosphonates, phosphonic acids, or derivatives thereof to organic or inorganic substrates via phosphonate chemistry.

SUMMARY

Provided herein are coated substrates. Also provided herein are methods for attaching phosphonates, phosphonic acids, or derivatives thereof to an organic or an inorganic substrate (e.g., a metal oxide substrate) via phosphonate chemistry to form the coated substrates provided herein.

DETAILED DESCRIPTION

Provided herein are phosphonate-coated materials and methods of preparation thereof.

In some embodiments, phosphonates or phosphonic acids are used in the preparation of metal-phosphonate compounds. In some embodiments, phosphonic acids are used in the synthesis of hybrid materials by grafting ligand or polymer chains covalently to metal oxides via P—O—M bonds. In some embodiments, these grafted ligands or polymer chains serve as either intermediate coupling molecules or terminal coupling molecules.

Compositions

In some aspects, provided herein are phosphonates or phosphonic acids, or a salt thereof.

In some embodiments, the phosphonate or phosphonic acid is of Formula I:

(I)

or a salt thereof.

In some embodiments, the phosphonate or phosphonic acid is of Formula II:

(II)

or a salt thereof.

In some embodiments, the phosphonate or phosphonic acid is of Formula III:

(III)

or a salt thereof.

In some embodiments, the phosphonate or phosphonic acid is of Formula IV:

(IV)

or a salt thereof.

In some embodiments, the phosphonate or phosphonic acid is of Formula V:

(V)

or a salt thereof.

In some embodiments, the phosphonate or phosphonic acid is of Formula VI:

(VI)

or a salt thereof.

In some embodiments, the phosphonate or phosphonic acid is of Formula VII:

(VII)

or a salt thereof.

In some embodiments, the phosphonate or phosphonic acid is of Formula V:

(V)

or a salt thereof,
wherein
$R^1$ is $-(CH_2)_2N^{(+)}(CH_3)_3$, $-(CH_2)_6NH_2$, $-(CH_2)_9COOH$, $-(CH_2)_6R^4$ or $-(CH_2)_9R^4$;
$R^4$ is or

;

m is 1-1000 (e.g., 1-100, e.g., 1-50, e.g., 1-10); and
n is 1-1000 (e.g., 1-100, e.g., 1-50, e.g., 1-10).

In some embodiments, the phosphonate or phosphonic acid is of Formula V:

(V)

or a salt thereof,
wherein
$R^1$ is $-(CH_2)_2N^{(+)}(CH_3)_3$.

In some embodiments, the phosphonate or phosphonic acid is of Formula V:

(V)

or a salt thereof,
wherein
$R^1$ is $-(CH_2)_6NH_2$.

In some embodiments, the phosphonate or phosphonic acid is of Formula V:

(V)

or a salt thereof,
wherein
$R^1$ is $-(CH_2)_9COOH$.

In some embodiments, the phosphonate or phosphonic acid is of Formula V:

(V)

or a salt thereof,
wherein
$R^1$ is $-(CH_2)_6R^4$;

R⁴ is m is 1-1000 (e.g., 1-100, e.g., 1-50, e.g., 1-10); and
n is 1-1000 (e.g., 1-100, e.g., 1-50, e.g., 1-10).

In some embodiments, the phosphonate or phosphonic acid is of Formula V:

(V)

or a salt thereof,
wherein
$R^1$ is —$(CH_2)_9R^4$;
$R^4$ is m is 1-1000 (e.g., 1-100, e.g., 1-50, e.g., 1-10); and
n is 1-1000 (e.g., 1-100, e.g., 1-50, e.g., 1-10).

In some aspects, provided herein are coated substrates comprising Formula VIII:

ZJ¹  (VIII);

or a salt thereof,
wherein
Z is an organic or inorganic substrate; and
$J^1$ is —OH.

In some aspects, provided herein are coated substrates comprising Formula IX:

(IX)

or a salt thereof,
wherein
Z is an organic or inorganic substrate;
$J^2$ is —$C_{1-20}$-alkyl-$N^{(+)}(CH_3)_3$, —$C_{1-20}$-alkyl-$NH_2$, —$C_{1-20}$-alkyl-COOH, —$C_{1-20}$-alkyl-$R^4$;
$R^4$ is or

;

m is 1-1000 (e.g., 1-100, e.g., 1-50, e.g., 1-10); and
n is 1-1000 (e.g., 1-100, e.g., 1-50, e.g., 1-10).

In some aspects, provided herein are coated substrates comprising Formula IX and/or IXb:

(IX)

(IXb)

or a salt thereof, wherein

Z, $Z^1$, and $Z^2$ are each an organic or inorganic substrate or can be the same organic or inorganic substrate and/or bonded to the same location on the substrate;

$J^2$ is —$C_{1-20}$-alkyl-$N^{(+)}(CH_3)_3$, —$C_{1-20}$-alkyl-$NH_2$, —$C_{1-20}$-alkyl-COOH, or —$C_{1-20}$-alkyl-$R^4$;

$R^4$ is m is 1-1000 (e.g., 1-100, e.g., 1-50, e.g., 1-10); and
n is 1-1000 (e.g., 1-100, e.g., 1-50, e.g., 1-10).

In some aspects, provided herein are coated substrates comprising Formula IX, Formula IXb, or a combination of Formula IX and Formula IXb.

In some embodiments of these aspects, $J^2$ is —$(CH_2)_2N^{(+)}(CH_3)_3$, —$(CH_2)_6NH_2$, —$(CH_2)_9COOH$, —$(CH_2)_6R^4$ or —$(CH_2)_9R^4$.

In some embodiments of these aspects, $J^2$ is —$C_{1-20}$-alkyl-$R^4$.

In some embodiments of these aspects, $J^2$ is —$(CH_2)_6R^4$.
In some embodiments of these aspects, $J^2$ is —$(CH_2)_9R^4$.

In some aspects, provided herein are coated substrates comprising Formula X:

or a salt thereof, wherein

Z is an organic or inorganic substrate;

$J^2$ is —$C_{1-20}$-alkyl-$N^{(+)}(CH_3)_3$, —$C_{1-20}$-alkyl-$NH_2$, or —$C_{1-20}$-alkyl-COOH.

In some aspects, provided herein are coated substrates comprising Formula X and/or Xb:

or a salt thereof, wherein

Z, $Z^1$, and $Z^2$ are each an organic or inorganic substrate or can be the same organic or inorganic substrate and/or bonded to the same location on the substrate; and $J^2$ is —$C_{1-20}$-alkyl-$N^{(+)}(CH_3)_3$, —$C_{1-20}$-alkyl-$NH_2$, or —$C_{1-20}$-alkyl-COOH.

In some aspects, provided herein are coated substrates comprising Formula X, Formula Xb, or a combination of Formula X and Formula Xb.

In some embodiments of these aspects, $J^2$ is —$(CH_2)_2N^{(+)}(CH_3)_3$.

In some embodiments of these aspects, $J^2$ is —$(CH_2)_6NH_2$.

In some embodiments of these aspects, $J^2$ is —$(CH_2)_9COOH$.

In some embodiments, $J^2$ is —$(CH_2)_6R^4$; and
$R^4$ is

In some embodiments, $J^2$ is —$(CH_2)_9R^4$; and $R^4$ is

In some embodiments of Formulae I-IX, $R^1$, $R^2$ and $R^3$ are, independently, —$C_{1-20}$-alkyl-$N^{(+)}(CH_3)_3$, —$C_{1-20}$-alkyl-$NH_2$, —$C_{1-20}$-alkyl-COOH, or —$C_{1-20}$-alkyl-$R^4$;
$R^4$ is

$m$ is 1-1000 (e.g., 1-100, e.g., 1-50, e.g., 1-10); and
$n$ is 1-1000 (e.g., 1-100, e.g., 1-50, e.g., 1-10).

In some embodiments of Formulae I-IX, $R^1$, $R^2$ and $R^3$ are, independently, —$(CH_2)_2N^{(+)}(CH_3)_3$, —$(CH_2)_6NH_2$, —$(CH_2)_9COOH$, —$(CH_2)_6R^4$ or —$(CH_2)_9R^4$.

In some embodiments of Formulae I-IX, $R^4$ is

In some embodiments of Formulae I-IX, $R^4$ is

In some aspects, provided herein is a coated substrate comprising a substrate and a first coating layer, wherein the first coating layer is bound to the substrate.

In some aspects, provided herein is a coated substrate comprising a substrate, a first coating layer and a second coating layer, wherein the first coating layer is bound to the substrate, and the second coating layer is bound to the first coating layer.

In some embodiments of these aspects, the first coating layer is covalently bound to the substrate. In some embodiments, the first coating layer is non-covalently bound to the substrate.

In some embodiments, the second coating layer is covalently bound to the first coating layer. In some embodiments, the second coating layer is non-covalently bound to the first coating layer.

In some embodiments, the first coating layer is covalently bound to the substrate, and the second coating layer is covalently bound to the first coating layer.

In some embodiments, the first coating layer is covalently bound to the substrate by at least one of Formulae XI-XVI:

(XI)

wherein

J² is the first coating layer and is —C$_{1-20}$-alkyl-N$^{(+)}$(CH$_3$)$_3$, —C$_{1-20}$-alkyl-NH$_2$, or —C$_{1-20}$-alkyl-COOH; and Z is the substrate.

In some embodiments, the first coating layer is covalently bound to the substrate by at least one of Formulae XI, XIb, XII, XIII, XIIIb, XIV, XIVb, XV, XVI, and/or XVIb:

wherein

J² is the first coating layer and is —C$_{1-20}$-alkyl-N$^{(+)}$(CH$_3$)$_3$, —C$_{1-20}$-alkyl-NH$_2$, or —C$_{1-20}$-alkyl-COOH; and Z, Z¹, Z², and Z³ are each an organic or inorganic substrate or can be the same organic or inorganic substrate and/or bonded to the same location on the substrate.

In some embodiments, the second coating layer is covalently bound to the first coating layer by at least a peptide bond.

In some embodiments, the second coating layer is covalently bound to the first coating layer by at least a peptide bond as shown in Formula XVII:

wherein X¹ is the first coating layer, and X² is the second coating layer.

In some embodiments, the second coating layer is covalently bound to the first coating layer by at least a peptide bond as shown in Formula XVIII:

wherein $X^1$ is the first coating layer, and $X^2$ is the second coating layer.

In some embodiments, the substrate is an organic substrate. In some embodiments, the substrate is an inorganic substrate. In some embodiments, the substrate is a metal or metal alloy such as, but not limited to aluminum, titanium, zinc, platinum, tantalum, copper, nickel, rhodium, gold, silver, palladium, chromium, iron, indium, ruthenium, osmium, tin, iridium, or combinations thereof. In some embodiments, the substrate is a metal alloy. In some embodiments, the metal alloy is an intermetallic alloy. In some embodiments the metal alloy is a nickel-titanium alloy (e.g., nitinol). In some embodiments, the metal alloy is an electropolished metal alloy. In some embodiments, the metal alloy has a thermal hysteresis martensitic transformation range of about 20-50 K (e.g., about 20 K, 25 K, 30 K, 35 K, 40 K, 45 K, 50 K or any range bounded by two of these values, e.g., about 20-25 K, 35-40 K, 35-50 K or 45-50 K).

In some embodiments, the first coating layer is a hydrophilic, a hydrophobic, or an amphiphilic coating layer. In some embodiments, the second coating layer is a hydrophilic, a hydrophobic, or an amphiphilic coating layer.

In some embodiments, the first coating layer has a distal end and a proximal end, and the proximal end is bound to the substrate, and the distal end comprises a hydroxyl, a primary amine, a secondary amine, a tertiary amine, a quaternary amine, a carboxylic acid, an amide, or a salt thereof. In some embodiments, the first coating layer is an alkyl layer (e.g., $C_{1-20}$-alkyl).

In some embodiments, the first coating layer is —(CH$_2$)$_2$N$^{(+)}$(CH$_3$)$_3$, —(CH$_2$)$_6$NH$_2$, or —(CH$_2$)$_9$COOH.

In some embodiments, the second coating layer is a LIPIDURE. In some embodiments, the LIPIDURE is LIPIDURE NH01 or LIPIDURE AC01. In some embodiments, the second coating layer is of Formula XIX:

(XIX)

wherein
m is 1-1000 (e.g., 1-100, e.g., 1-50, e.g., 1-10); and
n is 1-1000 (e.g., 1-100, e.g., 1-50, e.g., 1-10).

Methods

Provided herein are methods of preparing the compositions provided herein.

In one aspect, provided herein are methods for preparing a coated substrate provided herein, comprising contacting a substrate provided herein with a phosphonate, a phosphonic acid, or salt thereof provided herein such that the coated substrate is formed.

In some embodiments, the substrate is contacted with the phosphonate, the phosphonic acid, or salt thereof under heat in a vacuum oven to form the coated substrate.

In some embodiments, the substrate is a substrate of Formula VIII.

In some embodiments, the phosphonate, phosphonic acid, or salt thereof is of Formula I, Formula II, Formula III, Formula IV, Formula V, Formula VI, or Formula VII.

In some embodiments, the coated substrate comprises Formula X:

(X)

or a salt thereof,
wherein
Z is an organic or inorganic substrate; and
$J^2$ is —(CH$_2$)$_2$N$^{(+)}$(CH$_3$)$_3$, —(CH$_2$)$_6$NH$_2$, —(CH$_2$)$_9$COOH.

In some embodiments, the coated substrate comprises Formula X and/or Xb:

or a salt thereof,
wherein
Z, $Z^1$, and $Z^2$ are each an organic or inorganic substrate or can be the same organic or inorganic substrate and/or bonded to the same location on the substrate; and
$J^2$ is —(CH$_2$)$_2$N$^{(+)}$(CH$_3$)$_3$, —(CH$_2$)$_6$NH$_2$, or —(CH$_2$)$_9$COOH.

In some aspects, the coated substrate comprises Formula X, Formula Xb, or a combination of Formula X and Formula Xb.

In some embodiments, the coated substrate is further contacted with a compound of Formula XX:

(XX)

or a salt thereof,
wherein
m is 1-1000 (e.g., 1-100, e.g., 1-50, e.g., 1-10); and
n is 1-1000 (e.g., 1-100, e.g., 1-50, e.g., 1-10); or the coated substrate is further contacted with a compound of Formula XXI:

(XXI)

or a salt thereof,
wherein
m is 1-1000 (e.g., 1-100, e.g., 1-50, e.g., 1-10); and
n is 1-1000 (e.g., 1-100, e.g., 1-50, e.g., 1-10);
to form a coated substrate comprising Formula IX:

(IX)

or a salt thereof,
wherein
Z is an organic or inorganic substrate;
$J^2$ is —$C_{1-20}$-alkyl-$R^4$;
$R^4$ is or m is 1-1000 (e.g., 1-100, e.g., 1-50, e.g., 1-10); and
n is 1-1000 (e.g., 1-100, e.g., 1-50, e.g., 1-10).

In some embodiments, the coated substrate is further contacted with a compound of Formula XX:

(XX)

or a salt thereof,
wherein
m is 1-1000 (e.g., 1-100, e.g., 1-50, e.g., 1-10); and
n is 1-1000 (e.g., 1-100, e.g., 1-50, e.g., 1-10); or
the coated substrate is further contacted with a compound of Formula XXI:

(XXI)

or a salt thereof, wherein
m is 1-1000 (e.g., 1-100, e.g., 1-50, e.g., 1-10); and
n is 1-1000 (e.g., 1-100, e.g., 1-50, e.g., 1-10);
to form a coated substrate comprising Formula IX and/or IXb:

or a salt thereof,
wherein
Z, $Z^1$, and $Z^2$ are each an organic or inorganic substrate or can be the same organic or inorganic substrate and/or bonded to the same location on the substrate;
$J^2$ is —$C_{1-20}$-alkyl-$R^4$;
$R^4$ is m is 1-1000 (e.g., 1-100, e.g., 1-50, e.g., 1-10); and
n is 1-1000 (e.g., 1-100, e.g., 1-50, e.g., 1-10).

In some aspects, the coated substrate comprises Formula IX, Formula IXb, or a combination of Formula IX and Formula IXb.

Those skilled in the art will recognize, or be able to ascertain using no more than routine experimentation, numerous equivalents to the specific procedures, embodiments, claims, and examples described herein.

It is to be understood that wherever values and ranges are provided herein, all values and ranges encompassed by these values and ranges, or a combination of these values and ranges, are meant to be encompassed within the scope of the aspects and embodiments provided herein. Moreover, all values that fall within these ranges, as well as the upper or lower limits of a range of values, are also contemplated by the present application.

EXAMPLES

The following Examples further illustrate aspects of the compositions and methods provided herein. However, these Examples are in no way a limitation of the teachings or disclosure as set forth herein. These Examples are provided for illustration purposes.

Example 1

Phosphonates or Phosphonic Acids as Intermediate Coupling Molecules

Figure 1:
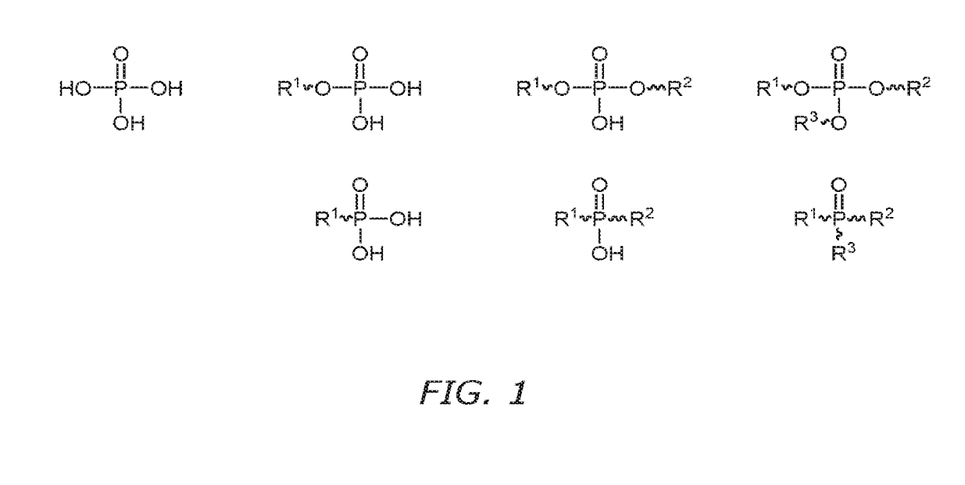
FIG. 1 shows various phosphonate (and derivative) configurations that can be utilized herein as coupling molecules to functionalize organic and inorganic substrates.
Figure 2:
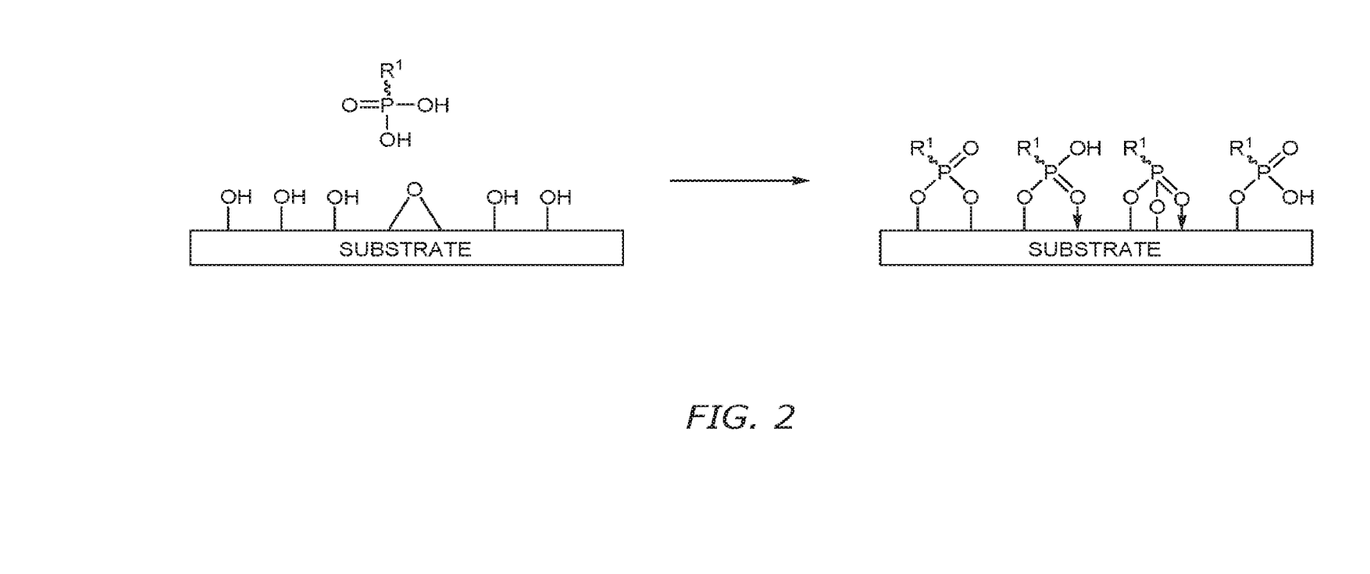
FIG. 2 shows a generic representation of —P—O—M— binding of phosphonic acids to a metal oxide substrate via different bonding modes.
Figure 3:
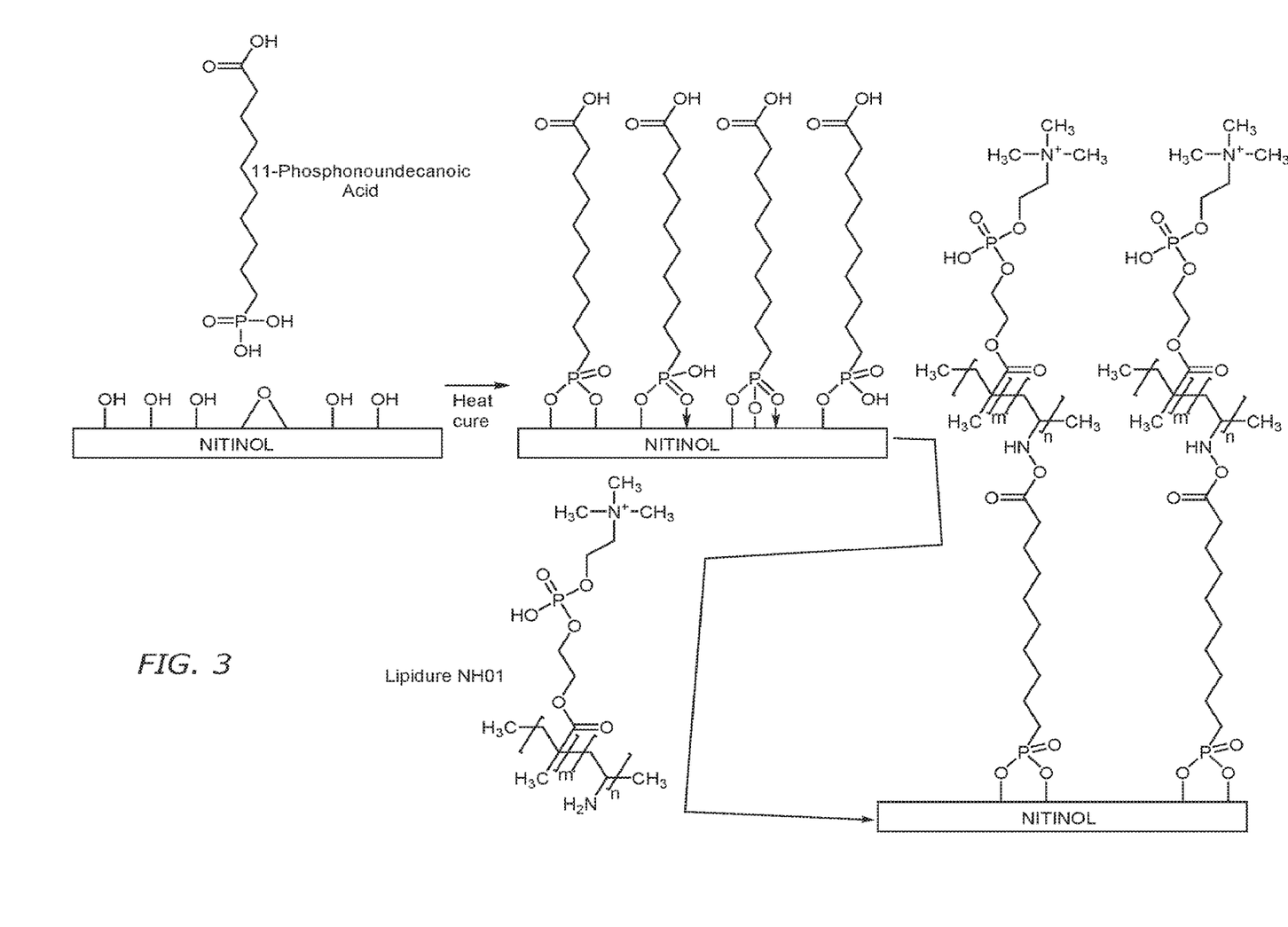
FIG. 3 shows 11-phosphonoundecanoic acid serving as an intermediate coupling molecule for subsequent grafting of phosphorylcholine derivatives (e.g., LIPIDURE NH01).
Figure 4:
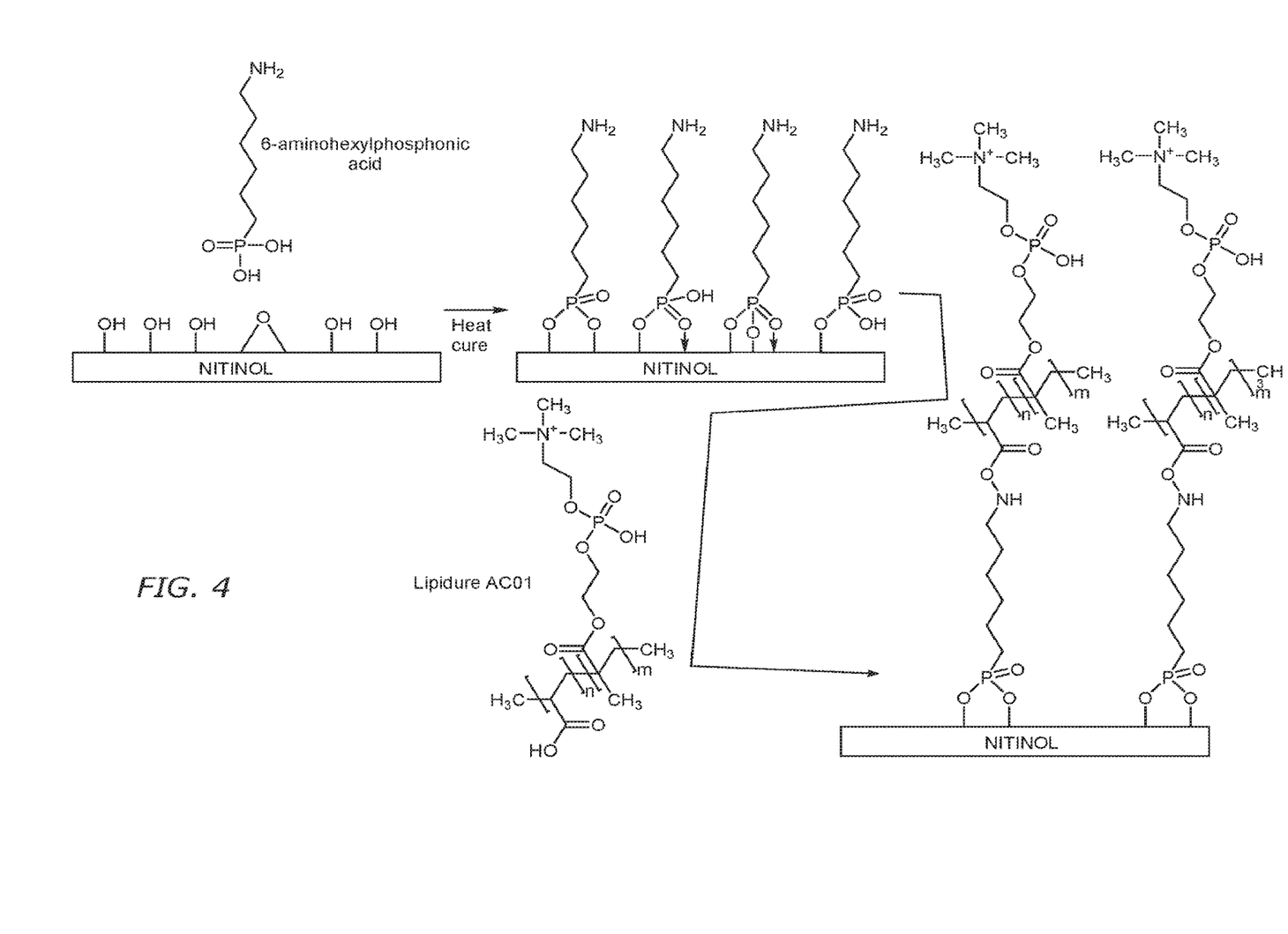
FIG. 4 shows 6-aminohexylphosphonic acid serving as an intermediate coupling molecule for subsequent grafting of phosphorylcholine derivatives (e.g., LIPIDURE AC01).

Ligand containing phosphonates can be covalently bound to metal oxide for the subsequent functionalization and modification of a particular substrate. Electropolished nitinol coupons were cleaned via sonication. The coupons were boiled in DI $H_2O$ as conventional and inductive heating has been demonstrated to increase the oxidation of metallic surfaces. A COOH terminus containing phosphonate was applied using the T-BAG deposition method as well as incubation in THF or mixtures of THF and water. The Nitinol coupons were heat cured in a vacuum oven. LIPI-DURE NH01 (amino functionalized phosphorylcholine) was grafted to the phosphonate tie layer through the formation of peptide bonds. FIG. 3 shows the reaction scheme. FIG. 4 shows a reaction scheme—similar to FIG. 3—where an amino terminus containing phosphonate was applied using the aforementioned T-BAG deposition method where LIPIDURE AC01 (carboxyl functionalized phosphorylcholine) was grafted to the phosphonate tie layer through the formation of peptide bonds.

Example 2

Phosphonates or Phosphonic Acids as Terminal Coupling Molecules

Phosphonates and PA's can be directly covalently bound to metal oxides, forming a self-assembling monolayer that alters the surface composition of the substrate, and thus modifying the substrate properties.

Figure 5:
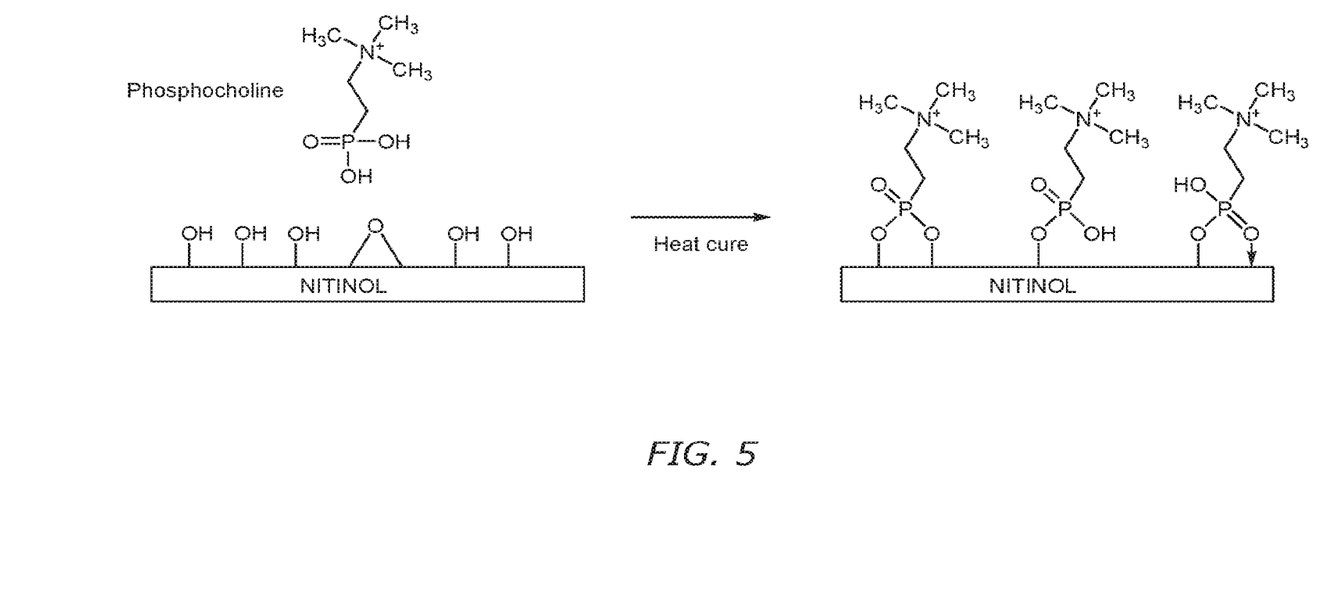
FIG. 5 shows phosphocholine acid serving as a direct coupling molecule for metal oxide surface modification.

Electropolished Nitinol coupons were cleaned via sonication. The coupons were boiled in DI $H_2O$ as conventional and inductive heating has been demonstrated to increase the oxidation of metallic surfaces. Phosphocholine was directly applied using the aforementioned T-BAG deposition method. Ethanol was used as the carrier solvent in this case. The nitinol coupons were heat cured in a vacuum oven. FIG. 5 shows the proposed reaction scheme.

Although nitinol was used in these examples, in some embodiments the chemistry is applicable to a metal/metal alloy oxide surface. In some embodiments, the phosphonate/phosphoric acid (or derivative) comprises at least 1 (e.g., 2, 3, 4, 5, 6, 7, 8, 9 or 10) functionalized ligand. In some embodiments, the ligands include, but are not limited to, an aliphatic, branched or ring moiety containing free amino, carboxyl or thiol groups. In some embodiments, the carrier solvent used for the T-BAG deposition is a solvent in which the intermediate coupling molecule is soluble or substantially soluble (e.g., at least 80%, 90%, 95% or 99% soluble).

Results

Example 1 and Example 2

Multiple phosphonate materials were investigated. Successful coatings were determined by water contact angle testing of nitinol hypotubes that were electropolished per standard stent practices (Table 1). The application of the phosphonate retains a hydrophobic surface of the nitinol for all but the application of the phosphocholine NaCl salt. The conjugation of the LIPIDURE to the phosphonate tie layer then reduces the water contact angle.

TABLE 1

Water contact angles for phosphonate basecoat (e.g., first coating layer) and LIPIDURE topcoats (e.g., second coating layer).

| Sample | Coating | Contact Angle (°) |
|---|---|---|
| Blank | Not applicable | 84.4 |
| Phosphocholine NaCl Salt (10 mmol) | Phosphocholine | 26.3 |
| 16-Phosphonohexadecanoic Acid | Lipidure-NH01 | 35.1 |
| 16-Phosphonohexadecanoic Acid | Basecoat | 79.1 |
| 11-Phosphonoundecanoic Acid | Lipidure-NH01 | 17.9 |
| 11-Phosphonoundecanoic Acid | Basecoat | 72.1 |
| 12-Bromododecanoic acid | Lipidure-NH01 | 26.9 |
| 12-Bromododecanoic acid | Basecoat | 82.6 |
| 12-Aminododecylphosphonic acid | Lipidure-AC01 | 21.1 |
| 12-Aminododecylphosphonic acid | Basecoat | 85.4 |

Incorporation by Reference and Equivalents

The contents of all references (including literature references, issued patents, published patent applications, and co-pending patent applications) cited throughout this application are hereby expressly incorporated herein by reference in their entireties. Unless otherwise defined, all technical and scientific terms used herein are accorded the meaning commonly known to one of ordinary skill in the art.

Those skilled in the art will recognize, or be able to ascertain using no more than routine experimentation, many equivalents of the specific embodiments provided herein. Such equivalents are intended to be encompassed by the following claims.

What is claimed is:

1. A coated substrate, comprising one of Formulae XI-XVIb, or a combination thereof:

(XI)

(XIb)

(XII)

(XIII)

(XIIIb)

(XIV)

(XIVb)

(XV)

(XVI)

(XVIb)

or a salt thereof,
wherein
$Z$, $Z^1$, $Z^2$, and $Z^3$ are each an organic or inorganic substrate;
$J^2$ —$C_{1-20}$-alkyl-$R^4$;
$R^4$ is -continued m is 1-1000; and
n is 1-1000.

2. The coated substrate of claim 1, wherein $J^2$ is —$(CH_2)_6$ $R^4$ or —$(CH_2)_9R^4$.

3. The coated substrate of claim 1, wherein $J^2$ is —$(CH_2)_6$ $R^4$.

4. The coated substrate of claim 1, wherein $J^2$ is —$(CH_2)_9$ $R^4$.

5. The coated substrate of claim 1, wherein $J^2$ is —$(CH_2)_6$ $R^4$; and
$R^4$ is

6. The coated substrate of claim 1, wherein $J^2$ is —$(CH_2)_9$ $R^4$; and
$R^4$ is

7. The coated substrate of claim 1, wherein $R^4$ is

8. The coated substrate of claim 1, wherein $R^4$ is

9. The coated substrate of claim 1, wherein $J^2$ is —$(CH_2)_9$ $R^4$; and R⁴ is 10. The coated substrate of claim 1, wherein $J^2$ is —$(CH_2)_6$ $R^4$; and R⁴ is 11. The coated substrate of claim 1, wherein m is 1-100, and n is 1-100.

12. The coated substrate of claim 1, wherein m is 1-50, and n is 1-50.

13. The coated substrate of claim 1, wherein m is 1-10, and n is 1-10.

* * * * *

UNITED STATES PATENT AND TRADEMARK OFFICE
CERTIFICATE OF CORRECTION

PATENT NO. : 11,674,050 B2
APPLICATION NO. : 16/754362
DATED : June 13, 2023
INVENTOR(S) : Aaron Baldwin, John Belletto and Garrett Ulrich It is certified that error appears in the above-identified patent and that said Letters Patent is hereby corrected as shown below:

In the Claims

In Claim 1, Column 20, Line 47, replace "$J^2$ —$C_{1-20}$-alkyl-$R^4$" with --$J^2$ is —$C_{1-20}$-alkyl-$R^4$--.

Signed and Sealed this
Twenty-fifth Day of July, 2023

Katherine Kelly Vidal
*Director of the United States Patent and Trademark Office*